United States Patent
Wyener

[11] 3,854,225
[45] Dec. 17, 1974

[54] ROTATING TANK DEMONSTRATOR

[75] Inventor: Robert L. Wyener, Casselberry, Fla.

[73] Assignee: The United States of America as represented by the Secretary of the Navy, Washington, D.C.

[22] Filed: May 14, 1973

[21] Appl. No.: 353,879

[52] U.S. Cl. ................................................ 35/19 R
[51] Int. Cl. .......................................... G09b 23/06
[58] Field of Search ................. 35/18 R, 19 R, 28.5; 128/370; 273/32; 119/5

[56] References Cited
UNITED STATES PATENTS
| | | | |
|---|---|---|---|
| 3,304,912 | 2/1967 | Hackman | 119/5 |
| 3,387,393 | 6/1968 | Musser | 35/45 |
| 3,629,958 | 12/1971 | Olson | 35/19 R |

OTHER PUBLICATIONS
"Henry" Cartoon by Carl Anderson, p. 21 of Washington Times for June 23, 1937

Cenco 1969 Educational Catalog pp. 236, 237 only

Primary Examiner—Harland S. Skogquist
Attorney, Agent, or Firm—R. S. Sciascia; J. W. Pease; J. F. Miller

[57] ABSTRACT

Concentric tanks on a rotating table under a transparent cover are filled with cold and warm liquids to simulate cold and warm circulation pattern of the seas and the atmosphere. Heating, cooling, sensing and control mechanisms make it possible to demonstrate the dynamics of atmospheric and oceanic circulations under various conditions. The effects of Coriolis, the geophysical principles associated with the earth's rotation, and the interrelationships of oceanic and atmospheric conditions can be demonstrated.

2 Claims, 4 Drawing Figures

ROTATING TANK DEMONSTRATOR

BACKGROUND OF THE INVENTION

The invention is in the field of training devices. In the prior art various devices have been used to demonstrate the effects and interrelationships of natural phenomena such as ocean waves, currents, winds, etc. For example, U.S. Pat. Nos. 3,478,444; 3,475,834; and 3,142,908 show devices for demonstrating the effects of ocean waves. However, none of the prior art devices known to applicant can demonstrate more complex principles. the invention overcomes the limitations of prior art devices by demonstrating more complex geophysical principles, such as Coriolis effects, and the interrelationships of various oceanic and atmospheric conditions.

SUMMARY OF THE INVENTION

Three concentric tanks are mounted on a rotatable table. An outer tank is filled with warm liquid, e.g., water, to simulate warm tropic seas. An inner tank is filled with cold liquid to simulate the arctic seas. When the table is rotated the Coriolis effect, or Coriolis acceleration effect, is observable in the liquid. A transparent cover placed over the tanks provides an airspace which makes it possible to observe the atmospheric effects of warm and cold seas and the earth's rotation. Means are provided for injecting dyes and plastic colored particles, or other materials into the liquid. This accentuates the visibility of the various effects of motion occurring in conjunction with heating and cooling of the liquid.

A center tank is provided with valves or openings into both the inner and outer tanks. By opening these valves the cold and warm liquids from the inner and outer tanks may be mixed to simulate the blending of arctic and tropical waters in temperate zones as influenced by Coriolis and other factors.

DESCRIPTION OF THE PREFERRED EMBODIMENT

Figure 1:
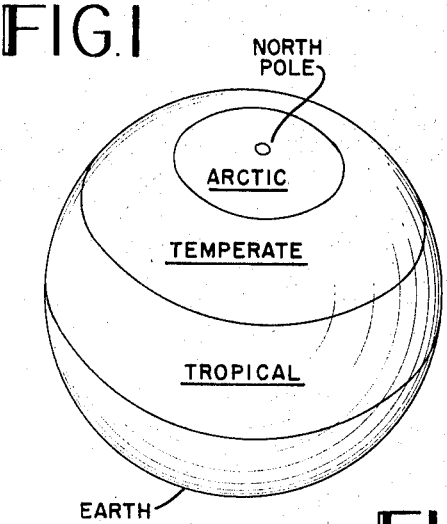
FIG. 1 represents a globe with the earth's temperature zones shown thereon.
Figure 2:
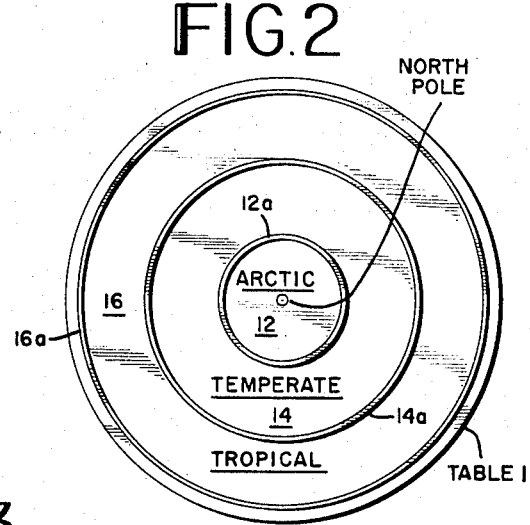
FIG. 2 is a plan view of three concentric tanks mounted on a rotatable table.

FIG. 1 represents the earth and shows an approximate arrangement of the arctic, temperate, and tropical temperature zones. FIG. 2 is a plan view of part of the invention showing a rotatable table 1 on which are mounted three concentric tanks, 12, 14, and 16. The view looking down on table 1 corresponds to the view of an observer in space over the pole looking down on the earth. Such an observer would see the arctic zone in the center of the globe with a temperature zone located between the arctic and the outer tropical zone. Thus, tank 12 on table 1 when filled with cold water simulates the arctic seas and outer tank 16 filled with warm water simulates the tropic seas.

Figure 4:
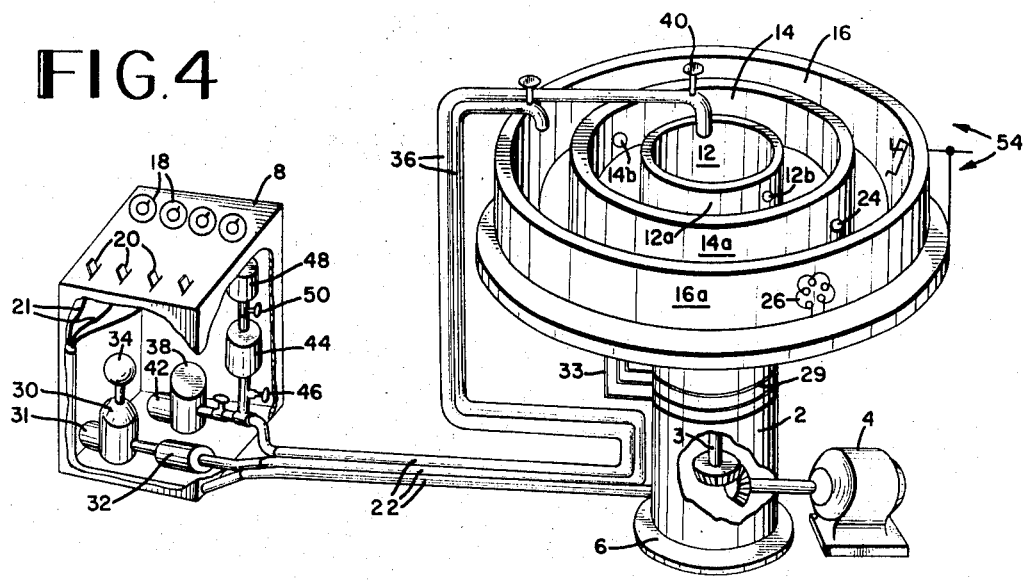
FIG. 4 shows the mechanism of the invention.

Referring now to FIG. 4, rotatable table top 1 is rotatably supported on a post 2 by a bearing not shown. Table top 1 is rotated at a selected speed by a shaft 3 connected to a variable speed motor 4.

The three tanks 12, 14, and 16 are formed by three concentric cylinders 12a, 14a, and 16a which have their bottom ends closed to form leakproof enclosures. Post 2 is fixed to a base 6 which may be anchored to the floor permanently or equipped with outriggers and leveling screws so as to be portable and easily leveled. A console 8 is equipped with a plurality of gages 18 and switches 20 which are connected by a plurality of wires 21 in a cable 22 to a plurality of sensors such as temperature sensors 24, and heating elements 26 located in or adjacent to tanks 12, 14, and 16. Gages 18 may be simple indicators or may be well known recording devices to maintain continuous records of temperature, salinity, turbidity, specific gravity, etc. Slip rings 29 and brushes 33 may provide rotating contacts in wires 21. A plurality of tanks such as 30, filters 32, pumps 34, and/or other equipment may be located in console 8 and connected to any of tanks 12, 14, and 16 through tubing not shown and exterior pipes such as pipe 36 shown or by concentric pipes and slip joints in post 2 which may connect to the bottom of tanks 12,, 14, and 16.

The tanks, gages, tubing, heating elements, etc., shown are shown by way of example. In general it is contemplated that tanks 12, 14, and 16 may be filled with liquid or drained to the degree desired at will by operation of switches 18 on console 8. The liquids used may be selectively heated or cooled to desired temperatures by operation of selected ones of switches 18. Heating and/or cooling circuits may be set to establish and maintain a desired liquid temperature in a well known manner. Heating and cooling means, storage tanks, pumps, valves, switches, etc., are well known and the exact arrangement and the means employed will be a design choice for a particular installation. For example, liquid storage, heating and cooling tanks, dispensing valves, dye dispensing means, etc., such as taught by Presnell et al in U.S. Pat. No. 3,478,444, issued Nov. 18, 1969, and titled "Ocean Current and Wave Generator" may be used. For example a tank 38 which supplies a cold water tank 12 through pipe 36 and a valve 40 may be equipped with refrigerating means 42 so as to store water at a desired temperature. Tank 30 may be equipped with heating means 31 in lieu of heating element 26 in the wall of cylinder 16a. A dye holding tank 44 connected to pipe 36 through a valve 46 may be used to selectively inject a dye into the liquid in tank 12. A compressor 48 is connected to tank 44 through a valve 50 to pressurize 44 at will. Similar provisions may be made to dye the liquid in tanks 14 and 16.

Figure 3:
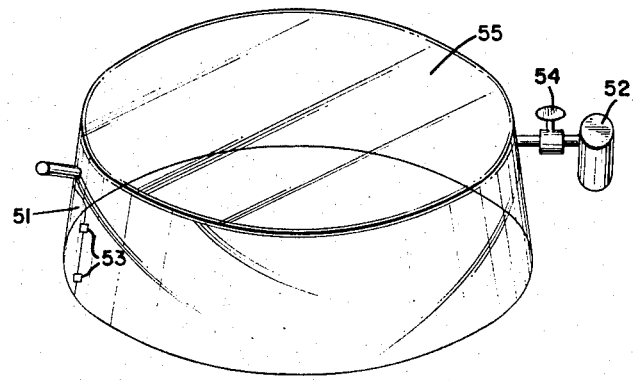
FIG. 3 shows a transparent cover for the tanks of FIG. 2.

The invention is operated by actuating a switch such as 20 on console 8 to turn on variable speed motor 4 causing table 1 and tanks 12, 14, and 16 to rotate, usually in clockwise direction. This simulates prevailing wind and current directions in the northern hemisphere. By filling inner tank 12 with cold water to simulate arctic seas and filling outer tank 16 with warm water to simulate tropical seas, the effects of Coriolis may be observed. Plugs such as 12b and 14b may be removed from openings in the wall of cylinders 12a and 14a (only two plugs and openings are shown, there may be several in each cylinder) to admit cold water from 12 and warm water from 16 to intermix in the middle tank 14. The plugs may be replaced with valves. If the waters from 12 and 16 are colored with dyes of different colors the effects of the mixings of cold arctic waters and warm tropical waters in the temperate zones and the effects of Coriolis can be observed in middle tank 14. This mixing is affected by the rotation of the tanks as the mixing of cold and warm seas is affected by the earth's rotation. The frictional effects of the rotating tank surfaces on adjacent waters are clearly evident. A transparent cover 55, shown in FIG. 3, may be placed over the tanks to create a closed airspace simulating the atmosphere. A pressurized aerosol container 52 is connected by a valve 54 to the interior of cover 55. The effects of the heating and cooling of layers and columns of air in the atmosphere by warm and cold seas is more readily observable when a colored aerosol is injected into cover 55. The combined effect of warm and cold waters and the effect of the earth's rotation on both the seas and the atmosphere are thus demonstrated with one piece of equipment. Pipes such as 36 may contain a swivel joint or flexible section permitting them to be moved out of the way so that a door 51 having hinges 53 on cover 55 may be closed to better contain the simulated atmosphere over the tanks. Door 51 may be opened permitting cover 55 to fit over pipes 36.

The observation of the Coriolis effect is enhanced by use of colored dyes and colored plastic particles. The water dyes will swirl in annular patterns and will intermix with warm and cold water circulations, induced by deflection and rotation, and will vary due to density, turbidity, and turbulence. The colored plastic particles will course in varied patterns, also induced by the circulation movements and currents of warm water intermixing with denser cold water.

What is claimed is:

1. In a training device for demonstrating the effects of Coriolis and the interrelationships of ocean and atmospheric circulation.

three concentric tanks formed by three concentric walls to provide an inner, an intermediate and an outer tank with a common axis of rotation for holding three liquid masses, means for rotating said tanks and liquids about said common axis of rotation, the inner of said walls being formed with ports selected in number and size to provide a desired mixing of liquids between adjacent tanks when said tanks are rotated, means providing color to said separate tanks of liquid, and heating and cooling means connected to said tanks to provide said inner, intermediate and outer tanks respectively with cold water representative of arctic seas, temperate water representative of the temperate seas and warm water representative of tropical waters to provide, when said tanks are rotated, the varied swirl patterns of the Coriolis effect induced by liquid circulation movements and currents of warm water intermixing with more dense cold water.

2. Apparatus according to claim 1, including a transparent cover for said tanks to provide an air space over said tanks to simulate the earth's atmosphere, and means introducing colored air in said air space to provide for observing the interrelationships of ocean and atmospheric circulation.

* * * * *